United States Patent
Schick et al.

(10) Patent No.: US 7,127,340 B2
(45) Date of Patent: Oct. 24, 2006

(54) VARIABLE GAIN LOGIC FOR A GPS BASED AUTOMATIC STEERING SYSTEM

(75) Inventors: Troy Eugene Schick, Cedar Falls, IA (US); Todd Wayne Rea, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 10 days.

(21) Appl. No.: 10/919,874

(22) Filed: Aug. 17, 2004

(65) Prior Publication Data

US 2006/0041354 A1    Feb. 23, 2006

(51) Int. Cl.
*B62D 1/00* (2006.01)
*B62D 5/04* (2006.01)

(52) U.S. Cl. .................. 701/41; 180/168; 318/580

(58) Field of Classification Search .................. 701/41, 701/26, 23, 25; 180/168; 318/580, 587, 318/611, 615, 619; 330/278
See application file for complete search history.

(56) References Cited

U.S. PATENT DOCUMENTS

| | | | | |
|---|---|---|---|---|
| 4,160,488 A | * | 7/1979 | Blakeslee | 180/168 |
| 5,373,911 A | * | 12/1994 | Yasui | 180/168 |
| 5,473,534 A | * | 12/1995 | Miyahara | 700/37 |
| 6,134,486 A | * | 10/2000 | Kanayama | 701/23 |
| 6,556,909 B1 | * | 4/2003 | Matsumoto et al. | 701/41 |
| 2005/0288834 A1 | * | 12/2005 | Heiniger et al. | 701/23 |

* cited by examiner

*Primary Examiner*—Dalena Tran

(57) ABSTRACT

A method is provided for controlling steering oscillations in a work vehicle having a closed loop GPS based automatic steering system, wherein the closed loop steering system has a default gain and a user defined gain. The method causes the system to automatically apply the default gain when an implement is raised and/or when a steering oscillation has been detected and to automatically apply the user defined gain when the implement has been lowered and/or the GPS track has been acquired.

5 Claims, 3 Drawing Sheets

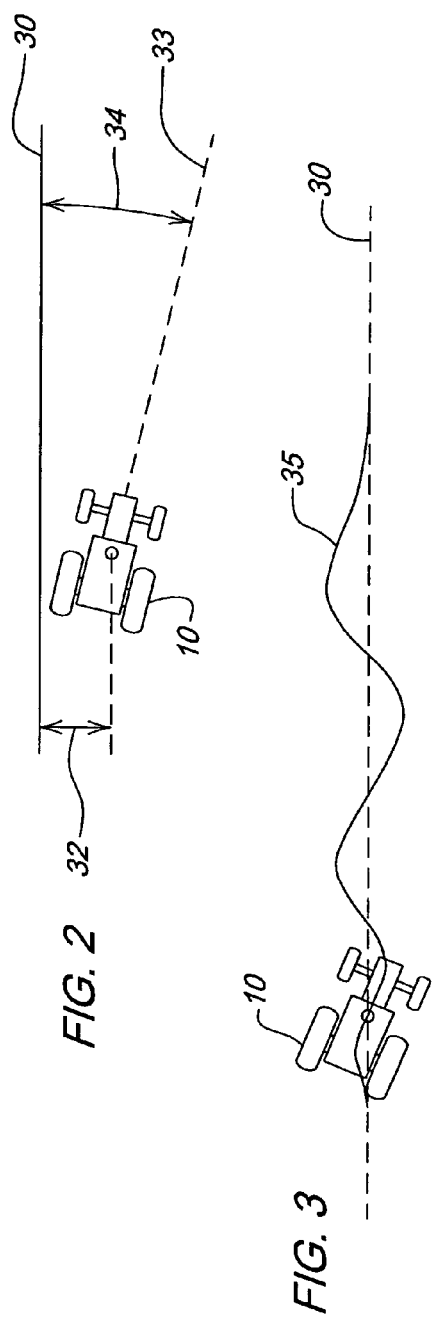
FIG. 2
FIG. 3
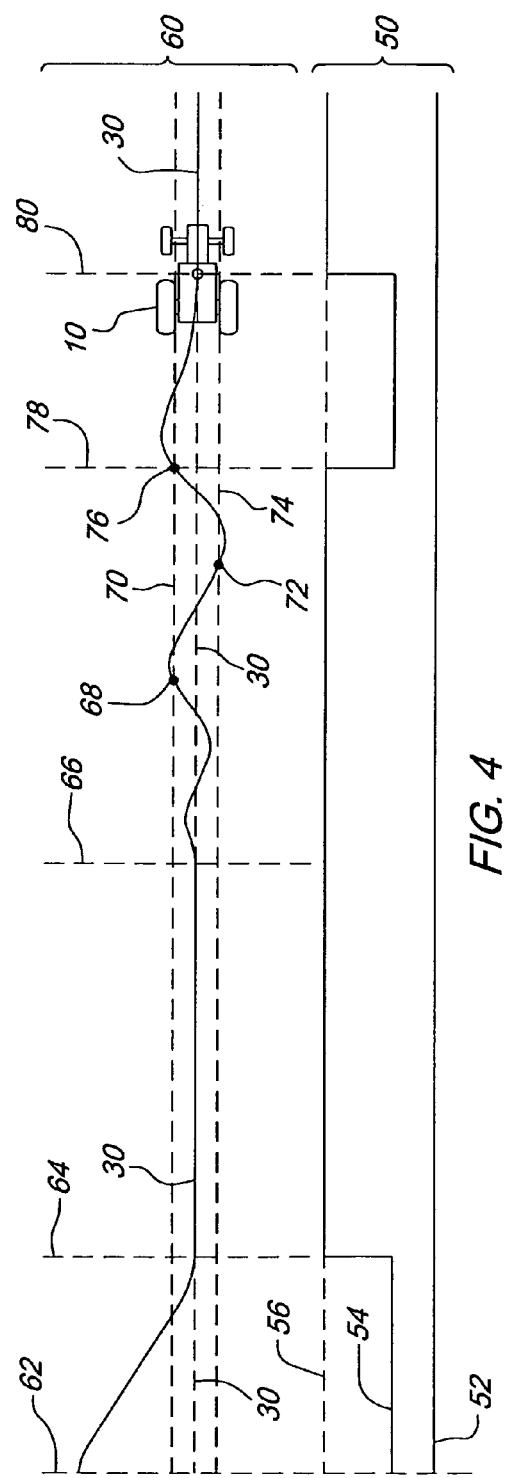
FIG. 4

VARIABLE GAIN LOGIC FOR A GPS BASED AUTOMATIC STEERING SYSTEM

FIELD OF THE INVENTION

The present invention relates generally to GPS based automatic vehicle steering systems such as are used with agricultural tractors or other work vehicles. More particularly, the present invention relates to such steering systems which have a user adjustable gain for the closed loop steering control system. Specifically, the present invention relates to logic for automatically applying a default gain or a user gain depending upon various factors including sensed oscillations, implement position, soil condition etc.

BACKGROUND OF THE INVENTION

Due to the increasing popularity of GPS based automatic steering systems in agricultural tractors, it has become important to develop a strategy to tune the closed loop steering control system for maximum accuracy over a wide range of applications. Some manufacturers today provide one or more user adjustable gains that are used to tune the closed loop control system for optimal performance when the implement is engaged in the ground. However, the control gains obtained with the implement in the ground are often too high when the automatic steering system is engaged while the implement is raised. This condition is common when acquiring the GPS track or when crossing waterways or lanes in the field. The high gains selected with the implement lowered in the ground for maximum accuracy cause undesirable steering oscillations when the implement is raised, especially on tractors with pneumatic tires. The tractor dynamics change considerably when the implement is raised and the high closed loop gains in the steering controller excite the tractor yaw resonant frequency. The steering control system gains may also be too high if a field soil condition is encountered that is significantly different than the condition present during the original tuning. When soil conditions change from soft to hard, the system damping decreases allowing the closed loop steering controller to excite the tractor yaw resonant frequency. If steering oscillations are present when acquiring the GPS track with the implement raised, a longer distance will be required for track acquisition. Planting and bedding applications require that the tractor be on track in the shortest distance possible when turning around at the end of the field with the implement raised. When oscillations occur due to varying soil conditions, steering accuracy is reduced. In each of these cases, the operator is forced to make a gain compromise between steering oscillations when the implement is raised and high accuracy when the implement is lowered. In some cases, the steering oscillation amplitude increases until the user is forced to turn the steering system off and lower the gain. Accordingly, a method is needed to automatically adjust the steering control system gains during track acquisition, when the implement is raised, or when steering oscillations are present. Further, this method must allow the user to tune the steering system for maximum accuracy without the penalty of poor system performance with a raised implement.

SUMMARY OF THE INVENTION

This invention consists of software logic implemented in a GPS based automatic steering system that automatically adjusts the steering control system gain during track acquisition and when steering system oscillations are present due to a raised implement or changing soil conditions. This software runs in the steering controller, which is part of the steering system. Current systems do not employ logic to detect and/or limit steering oscillations.

It is well known that the gain must be adjusted to adapt an automatic steering system to different implements, soil conditions, and vehicle tire and ballast configurations. This user adjustable gain is also required to maximize system accuracy with the implement engaged. For optimal performance, two levels of closed loop system gain are required. A default gain level is used when the implement is raised, and a user adjusted gain level is applied when the tractor is at work with the implement lowered. This invention provides logic on when to automatically apply the user gain or the default gain in the closed loop steering controller.

Objects of the invention together with the advantages thereof over the known art which will become apparent from the detailed specification which follows are attained by a method for controlling steering oscillations in a closed loop GPS based automatic steering system for a vehicle, the closed loop steering system having a default gain and a user defined gain, comprising the steps of: monitoring both heading and lateral errors from a desired GPS track; automatically applying the default gain when the lateral and heading errors exceed a predetermined threshold indicating a steering oscillation; and, automatically applying the user defined gain when the GPS track has been acquired.

Other objects of the invention are attained by a method for controlling steering oscillations in a closed loop GPS based automatic steering system for a vehicle, the closed loop steering system having a default gain and a user defined gain, comprising the steps of: determining whether a lateral error and a heading error are below threshold values which have been predetermined for the degree of accuracy desired; applying the default gain until the heading error is below threshold values which have been predetermined for the degree of accuracy desired; and, applying a user gain level after the heading error is below threshold values which have been predetermined for the degree of accuracy desired and maintaining the user defined gain until steering oscillations are detected or the closed loop steering control system is deactivated.

Still other objects of the invention are attained by a method for controlling steering oscillations in a closed loop GPS based automatic steering system for a vehicle, the closed loop steering system having a default gain and a user defined gain, comprising the steps of: determining whether a positive heading threshold crossover has occurred; setting a crossover flag and negative timer if a positive heading threshold crossover has occurred; determining whether both a positive crossover has been seen and a positive timer is less than a predetermined period; incrementing the positive timer if both a positive crossover has been seen and the positive timer is less than a predetermined period; determining whether the positive crossover timer is greater than a predetermined period; clearing the crossover flags and resetting the positive timer if the positive crossover timer is greater than a predetermined period; determining whether a negative heading threshold crossover has occurred; setting the crossover flag and positive timer if a negative heading threshold crossover has occurred; determining whether both a negative crossover has been seen and the negative timer is less than a predetermined period; incrementing a negative crossover timer if both a negative crossover has been seen and the negative timer is less than a predetermined period; determining whether the negative crossover timer is greater than a predetermined period; clearing the crossover flags and resetting the negative timer if the negative crossover timer is greater than a predetermined period; determining whether both the lateral and heading errors are within a predetermined threshold; setting a line acquired flag if both the lateral and heading errors are within a predetermined threshold; determining whether the automatic steering system is disabled; clearing the line acquired flag if the automatic steering system is disabled; applying a default gain if a steering oscillation is present; and, applying a user defined gain if no steering oscillation is present and the track has been acquired.

Further objects of the invention are attained by a method of controlling the gain of a closed loop GPS based automatic steering system having a default gain mode and a user defined gain mode comprising the step of: applying the user defined gain to the closed loop steering controller when an implement is lowered and the vehicle is at work.

Still further objects of the invention are attained by a method of controlling the gain of a closed loop GPS based automatic steering system having a default gain mode and a user defined gain mode comprising the step of: applying the default gain when an implement has been raised.

Additional objects of the invention are attained by a method of controlling steering oscillations of a vehicle using a closed loop GPS based automatic steering system comprising the step of: monitoring a lateral error and the amplitude and frequency of a heading error and applying a default gain when the amplitude of the heading error exceeds a defined threshold, the oscillation period of the heading error signal is less than a defined period, and the lateral error is within a lateral error window.

Other objects of the invention are attained by a method for controlling steering oscillations in an agricultural vehicle having a GPS based automatic steering system, the steering system having a steering controller controlling a valve for actuating a hydraulic cylinder used to turn the vehicle; a flowmeter or wheel angle sensor provided between the valve and the hydraulic cylinder to provide wheel angle information to the steering controller; the steering controller communicating with a display and mobile processor unit serving as a user interface and providing lateral and heading error information to the display; a GPS receiver providing position information to the controller; a switch operable to activate the steering system; and a steering wheel sensor operable to automatically deactivate the system in response to operator movement of the steering wheel, wherein a GPS track defines the desired course for the vehicle, a lateral error is defined as the distance of the vehicle from the GPS track and a heading error is defined as the angle of the vehicle's actual track from the GPS track comprising the steps of: determining whether the lateral error and heading error are below threshold values which have been predetermined for the degree of accuracy desired; applying the default gain until the heading error is below threshold values which have been predetermined for the degree of accuracy desired; applying a user gain level after these conditions are satisfied and maintaining the user gain level until steering oscillations are detected or the closed loop steering control system is deactivated.

In general, a method is provided for controlling steering oscillations in a work vehicle having a closed loop GPS based automatic steering system, wherein the closed loop steering system has a default gain and a user defined gain. The method causes the system to automatically apply the default gain when an implement is raised and/or when a steering oscillation has been detected and to automatically apply the user defined gain when the implement has been lowered and/or the GPS track has been acquired.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein:

FIG. 2 is a schematic illustration of a vehicle's lateral and heading errors from a GPS track;

FIG. 3 illustrates a steering oscillation of a vehicle relative to a GPS track;

FIG. 4 is a schematic illustration wherein the gain levels are plotted against the vehicle track; and, FIG. 5 is a flow chart illustrating the logic of the method according to the invention.

DESCRIPTION OF THE PREFERRED EMBODIMENT

Figure 1:
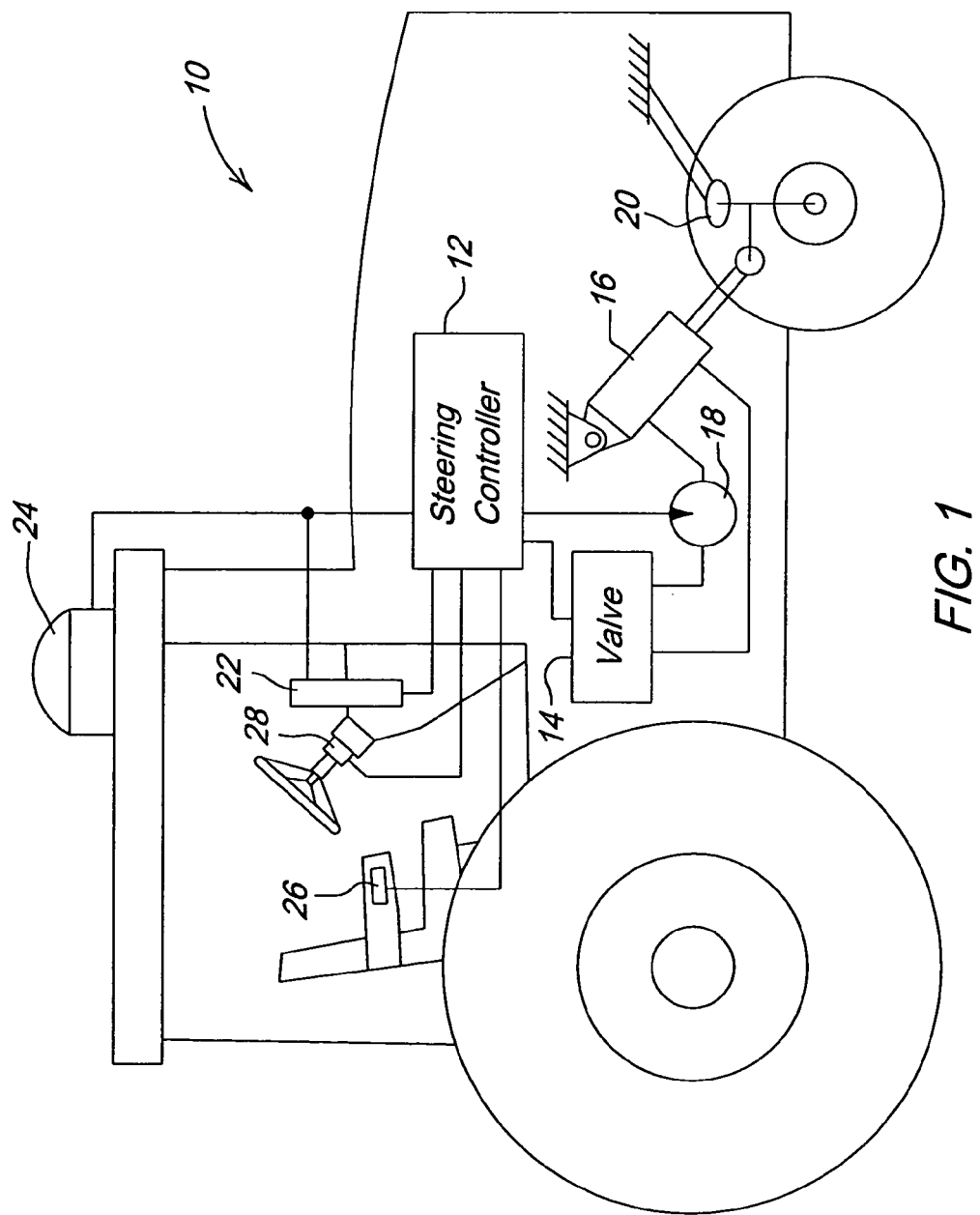
FIG. 1 is schematic view of a work vehicle having a closed loop GPS based automatic steering system.

With reference now to FIG. 1, it can be seen that an agricultural tractor having a GPS based automatic steering system is illustrated schematically, and is designated generally by the numeral 10. A steering controller 12 controls a valve 14 for actuating a hydraulic cylinder 16 used to turn the vehicle. A flowmeter 18 may be provided between the valve 14 and the hydraulic cylinder 16 to provide wheel angle information to the steering controller 12. Alternatively a wheel angle sensor 20 may be provided for this purpose. The steering controller 12 communicates with a display and mobile processor unit 22 which serves as a user interface and provides lateral and heading error information to the display 22. A GPS receiver 24 provides position information to the controller 12. A switch 26 activates the steering system, while a steering wheel sensor 28 automatically deactivates the system in response to operator movement of the steering wheel.

FIG. 2 illustrates the lateral and heading error variables used by the invention to control an automatic steering system. A GPS track 30 defines the desired course for the vehicle 10. The lateral error 32 is the distance of the vehicle 10 from the GPS track 30. The heading error 34 is the angle of the vehicle's actual track 33 from the GPS track 30. The GPS track 30 is considered to be acquired when the lateral error 32 and heading error 34 are below threshold values which have been predetermined for the degree of accuracy desired. While these threshold values can vary depending upon the degree of accuracy desired without departing from the spirit and scope of the invention, for purposes of illustration the following description utilizes a lateral error 32 of less than 0.25 meters and a heading error 34 of less than 0.75 degrees for track acquisition. Those having skill in the art will recognize that the error values used for a particular application may be greater than or less than those described here. During track acquisition, the invention applies the default gain until the heading error is within 0.75 degrees and the lateral error is within 0.25 meters. The user gain level is applied after these conditions are satisfied and remains in effect until steering oscillations are detected or the closed loop steering control system is deactivated at the end of the field.

Steering oscillations are detected by monitoring the lateral and heading errors. FIG. 3 illustrates a steering oscillation condition 35 caused by the closed loop steering controller with gains that are too high. The heading and lateral errors for this oscillation are sinusoidal and centered about zero. The frequency of this oscillation is a nominal 0.5 Hz. It follows then that this type of steering oscillation can be identified by monitoring the amplitude and frequency of the lateral error, heading error, or wheel angle. The logic used for this invention monitors the amplitude and frequency of the heading error while the tractor is within a lateral error window. A steering oscillation condition is defined when a heading error cycle meets the following conditions: 1.) the amplitude of the heading error must exceed a defined threshold; 2.) the oscillation period of the heading error signal must be less than a defined period; 3.) the lateral error is within a lateral error window.

FIG. 4 is an illustration of a vehicle track plotted against the gain levels applied by the method of the present invention. More particularly the gain levels are illustrated generally at 50, with 52 representing a level of zero gain, 54 representing the default gain level, and 56 representing a user defined gain level. The gain levels 50 are plotted against a vehicle track 60 starting at 62. As shown, from the time the track is started at 62 until the GPS track 30 is acquired at 64 the default gain level 54 is applied by the invention. Once the GPS track 30 is acquired at 64 the user defined gain level 56 is automatically applied by the invention. As can be seen, at 66 a condition change causes the vehicle 10 to begin to diverge from the GPS track 30. At 68 the invention logic notes that a crossover of the positive threshold 70 has occurred. Likewise at 72 the logic notes that a crossover of the negative threshold 74 has occurred. At 76 a second crossover of the positive threshold 70 is noted. At this point the logic recognizes that a steering oscillation condition exists and at 78 applies the default gain level 54. When the GPS track 30 is again acquired at 80 the user defined gain level 56 is again applied by the invention logic. Thus, when a steering oscillation condition is present, the closed loop steering controller gain is automatically set to the default value. After the steering condition has settled for the defined period, the user gain will be automatically applied to the closed loop steering controller providing that the line acquired condition is satisfied.

Figure 5:
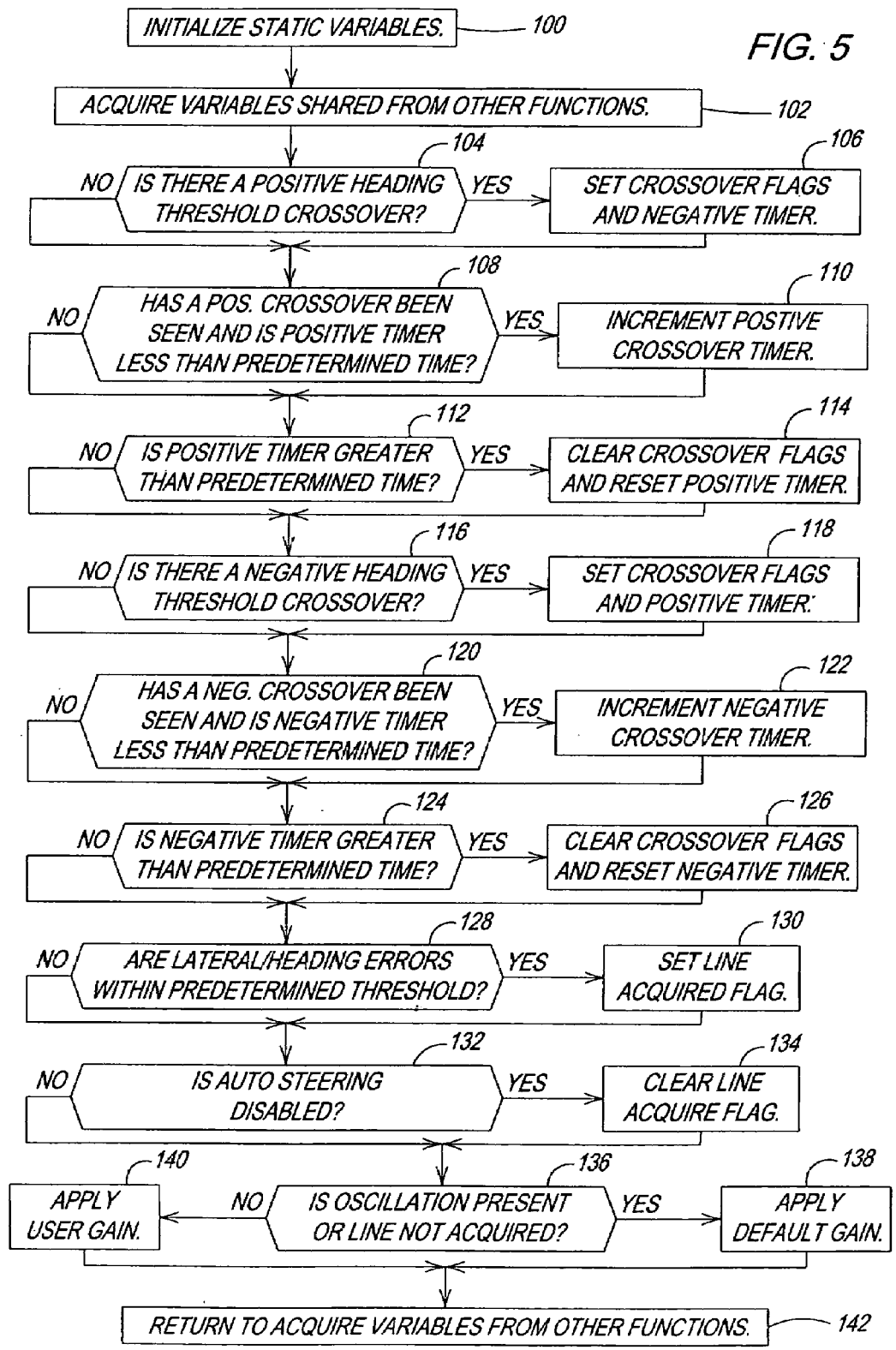

The steps for determining whether a steering oscillation is present and applying the appropriate gain are illustrated in the flowchart of FIG. 5. First the static variables are initialized at 100. The pseudo code listing for this step is:

negative_crossover_seen=FALSE
positive_crossover_seen=FALSE
past positive_crossover_seen=FALSE
past_negative_crossover_seen=FALSE
positive_timer=0
negative_timer=0
line_acquired=FALSE Variables from other functions are acquired at 102. These variables include the function task rate in seconds, whether automatic steering is active, the default gain, the user defined gain, the lateral error and the heading error. The pseudo code listing for this step is:

function_taskrate_in_seconds
automatic_steering_active
default_gain
user_defined_gain
lateral_error
heading_error At 104 a determination is made as to whether a positive heading threshold crossover has occurred. If a positive heading threshold crossover has occurred the crossover flag and negative timer are set at 106. The pseudo code listing for steps 104 and 106 is:

If (heading_error>1.5 degrees) & (abs(lateral_error)<0.5 meters) & (positive_crossover_seen=FALSE)
then:
positive_crossover_seen=TRUE
past_negative_crossover_seen=negative_crossover_seen
negative_crossover_seen=FALSE
negative_counter=0

Those having skill in the art will recognize that the heading and lateral error values used in the pseudo code listing are set according to the particular application and the values listed here are for purposes of illustration only and can be replaced by any other value practical to the particular application without departing from the spirit and scope of the invention.

Next at 108 a determination is made whether both a positive crossover has been seen and the positive timer is less than a predetermined period. If so, the positive crossover timer is incremented at 110. The pseudo code for these steps is:

If (positive_crossover_seen=TRUE) and (positive_timer<2.5 seconds)
then:
positive_timer=positive_timer+function_taskrate_in_seconds As with the heading and lateral error thresholds the time threshold can be any value which is practical to the application. The threshold of 2.5 seconds included in the pseudo code is for the purpose of illustration.

A determination as to whether the positive crossover timer is greater than a predetermined period is next made at 112. If the positive crossover timer is greater than the predetermined period, the crossover flags are cleared and the positive timer is reset at 114. The pseudo code for steps 112 and 114 is:

If positive_timer>=2.5 seconds
then:
positive_crossover_seen=FALSE
past_negative_crossover_seen=FALSE
past_positive_crossover_seen=FALSE
positive_timer=0

Next the logic determines whether a negative heading threshold crossover has occurred at 116. If a negative heading threshold crossover has occurred the crossover flag and positive timer are set at 118. The pseudo code listing for these steps is:

If (head_error<-1.5 degrees) and (abs(lateral_error)<0.5 meters) and (negative_crossover_seen=FALSE)
then:
negative_crossover_seen=TRUE
past_positive_crossover_seen=positive_crossover_seen
positive_crossover_seen=FALSE
positive_timer=0

A determination is next made at 120 whether both a negative crossover has been seen and the negative timer is less than a predetermined period. If so, the negative crossover timer is incremented at 122. The pseudo code for these steps is as follows:

If (negative_crossover_seen=TRUE) & (negative_timer<2.5 seconds)
then:
negative_timer=negative_timer+function_taskrate_in_seconds A determination as to whether the negative crossover timer is greater than a predetermined period is next made at 124. If the negative crossover timer is greater than the predetermined period, the crossover flags are cleared and the negative timer is reset at 126. The pseudo code for steps 124 and 126 is:

If negative_timer>=2.5 seconds
then:
   negative_crossover_seen=FALSE
   past_positive_crossover_seen=FALSE
   past_negative_crossover_seen=FALSE
   negative_counter=0

At 128 a determination is made whether both the lateral and heading errors are within a predetermined threshold. If so the line acquired flag is set at 130. The pseudo code for these steps is:

If (line_acquired=FALSE) & (abs(lateral_error)<0.25 meter) & (abs(heading_error)<0.75 degrees)
then:
   line_acquired=TRUE If at 132 the auto steering system is disabled, the line acquired flag is cleared at 134. The pseudo code for steps 132 and 134 is as follows:

If automatic_steering_active=FALSE
then:
   line_acquired=FALSE

If at 136 an oscillation is present and/or the GPS track has not been acquired the logic applies the default gain at 138. If, however, no oscillation is present and the track has been acquired, the logic applies the user defined gain at 140. The pseudo code for these steps is:

If(past_negative_crossover_seen=TRUE) & (past_positive_crossover_seen=TRUE) or (line_acquired=FALSE)
then:
   gain=default_gain
   line_acquired=FALSE
else:
   gain=user_defined_gain When the above logic sequence has been completed at 142 the sequence begins again at 102.

In addition to the above logic, the user gain level can be applied to the closed loop steering controller, for example, when any of the following conditions indicate that an implement is lowered and the vehicle is at work: (This information is available to the steering controller over the vehicle's CAN bus) 1.) the hitch position sensor reading drops below a user defined threshold; 2.) the hitch draft sensor reading exceeds a user defined threshold; 3.) the implement position sensor reading on the electro-hydraulic depth control (EHDC) equipped implements reaches the lowered position set point; 4.) the user designated SCV lower switch is activated; 5.) the hitch lower switch is activated; 6.) the engine load signal increases above a user defined threshold.

Similarly, the default gain level can be applied to the closed loop steering controller when any of the following conditions indicate that the implement has been raised: (This information is available to the steering controller over the vehicle's CAN bus) 1.) the hitch position sensor reading rises above a user defined threshold; 2.) the hitch draft sensor reading drops below a user defined threshold; 3.) the implement position sensor reading on the EHDC equipped implements reaches the raised position set point; 4.) the user designated SCV raise switch is activated; 5.) the hitch raise switch is activated; 6.) the engine load signal drops below a user defined threshold.

This method of changing the steering control system gains allows the user to optimize steering accuracy without affecting line acquisition performance. Also, when soil conditions change or the implement is raised, steering oscillations are limited resulting in improved accuracy. Finally, the operator now has time to make any required gain adjustments without having to turn the steering system off due to unbounded steering oscillations.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for controlling steering oscillations in a closed loop GPS based automatic steering system for a vehicle, the closed loop steering system having a default gain and a user defined gain, comprising the steps of:
   determining whether a lateral error and a heading error are below threshold values which have been predetermined for the degree of accuracy desired;
   applying the default gain until the heading error is below threshold values which have been predetermined for the degree of accuracy desired; and,
   applying a user gain level after the heading error is below threshold values which have been predetermined for the degree of accuracy desired and maintaining the user defined gain until steering oscillations are detected or the closed loop steering control system is deactivated.

2. A method for controlling steering oscillations in a closed loop GPS based automatic steering system for a vehicle, the closed loop steering system having a default gain and a user defined gain, comprising the steps of:
   determining whether a positive heading threshold crossover has occurred;
   setting a crossover flag and negative timer if a positive heading threshold crossover has occurred;
   determining whether both a positive crossover has been seen and a positive timer is less than a predetermined period;
   incrementing the positive timer if both a positive crossover has been seen and the positive timer is less than a predetermined period;

determining whether the positive crossover timer is greater than a predetermined period;

clearing the crossover flags and resetting the positive timer if the positive crossover timer is greater than a predetermined period;

determining whether a negative heading threshold crossover has occurred;

setting the crossover flag and positive timer if a negative heading threshold crossover has occurred;

determining whether both a negative crossover has been seen and the negative timer is less than a predetermined period;

incrementing a negative crossover timer if both a negative crossover has been seen and the negative timer is less than a predetermined period;

determining whether the negative crossover timer is greater than a predetermined period;

clearing the crossover flags and resetting the negative timer if the negative crossover timer is greater than a predetermined period;

determining whether both the lateral and heading errors are within a predetermined threshold;

setting a line acquired flag if both the lateral and heading errors are within a predetermined threshold;

determining whether the automatic steering system is disabled;

clearing the line acquired flag if the automatic steering system is disabled;

applying a default gain if a steering oscillation is present; and, applying a user defined gain if no steering oscillation is present and the track has been acquired.

3. A method for controlling steering oscillations in an agricultural vehicle having a GPS based automatic steering system, the steering system having a steering controller controlling a valve for actuating a hydraulic cylinder used to turn the vehicle; a flowmeter or wheel angle sensor provided between the valve and the hydraulic cylinder to provide wheel angle information to the steering controller; the steering controller communicating with a display and mobile processor unit serving as a user interface and providing lateral and heading error information to the display; a GPS receiver providing position information to the controller; a switch operable to activate the steering system; and a steering wheel sensor operable to automatically deactivate the system in response to operator movement of the steering wheel, wherein a GPS track defines the desired course for the vehicle, a lateral error is defined as the distance of the vehicle from the GPS track and a heading error is defined as the angle of the vehicle's actual track from the GPS track comprising the steps of:

determining whether the lateral error and heading error are below threshold values which have been predetermined for the degree of accuracy desired;

applying the default gain until the heading error is below threshold values which have been predetermined for the degree of accuracy desired;

applying a user gain level after these conditions are satisfied and maintaining the user gain level until steering oscillations are detected or the closed loop steering control system is deactivated.

4. A method for controlling steering oscillations in an agricultural vehicle having a GPS based automatic steering system as described in claim 3 wherein a lateral error is less than 0.25 meters and a heading error is less than 0.75 degrees for track acquisition.

5. A method for controlling steering oscillations in an agricultural vehicle having a GPS based automatic steering system as described in claim 3 wherein during track acquisition, the default gain is applied until the heading error is within 0.75 degrees of the GPS track and the lateral error is within 0.25 meters of the GPS track.

* * * * *